July 9, 1935.  P. KILIMNIK  2,007,804
COMBINATION SEAT AND BED
Filed Feb. 8, 1934
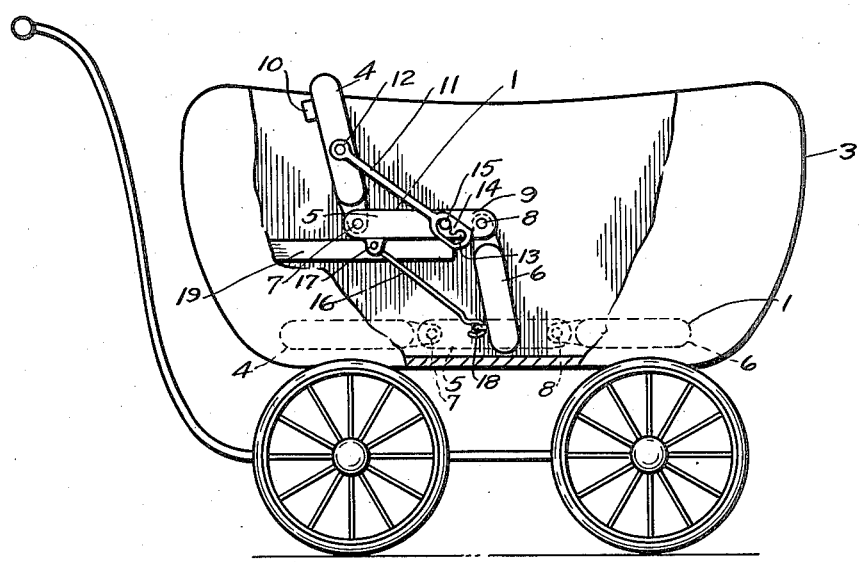
INVENTOR
Philip Kilimnik
BY
James Harrison Bowen
ATTORNEY Patented July 9, 1935

2,007,804

UNITED STATES PATENT OFFICE 2,007,804

COMBINATION SEAT AND BED

Philip Kilimnik, Middle Village, N. Y.

Application February 8, 1934, Serial No. 710,247

1 Claim. (Cl. 155—7)

The purpose of this invention is to provide an adjustable floor or false bottom adapted to be used in a baby carriage, crib, or the like, which may readily be formed into a seat so that a child may be placed comfortably in a sitting position.

The invention is an auxiliary floor or cushion in a baby carriage, or the like, which may be formed in hinged sections and arranged so that the sections may be adjusted to form a seat.

Baby carriages are normally provided with a flat bottom or with an adjustable portion for the feet and cushions are generally provided so that the child may be propped up in a sitting position. Folding baby carriages or go-carts of different types have also been provided, however, these are comparatively uncomfortable because the entire shell or framework is made with joints, so that it is adjustable.

The object of this invention is, therefore, to provide a jointed inner floor in a baby carriage, or the like, which may readily be positioned to form either a bed or seat.

And another object is to provide an adjustable seat for baby carriages, or the like, which is of a simple and economical construction.

With these ends in view the invention embodies an inner floor formed with hinged sections that may readily be folded to form a seat and which are provided with means for holding the seat in an upright position.

Other features and advantages of the invention will appear from the following description taken in connection with the drawing, wherein:

The drawing shows a side elevation of a baby carriage with part broken away, showing the device in the set up position and also in the flat position in the bottom of the carriage in dotted lines.

In the drawing the invention is shown as it may be made wherein numeral 1 indicates an auxiliary bottom of the jointed type, and numeral 3 a baby carriage in which the device may be used.

It will be understood that altho the device shown and described is adapted for baby carriages, it may also be used in any other objects, articles of furniture or vehicles, and may be used for any purpose. With a device of this type it is possible to form a baby carriage of the modernistic design, that is, with a continuous body having both ends alike and with a solid bottom and at the same time form a comfortable seat therein so that the child may lie upon a flat cushion or sit in an upright position and be comfortable in either position.

In the design shown, the device 1 is formed by three sections, 4, 5 and 6, which may be hinged at points 7 and 8 so that they may readily be adjusted to form a seat 9, and the part 4 forming the back may rest upon projections 10 in the carriage or may be held by bar 11 to the section 5, or supported in any manner. The bar 11 may be pivotally attached to the back 4 at the point 12 and the opposite end provided with a slot 13 having teeth 14 in one side by which the bar may be held over pins 15 on the side of the member 5. This bar may, however, be attached to the member 4 at any other point and any other means may be used for holding it to the part 5 or to any other part of the seat or carriage. The part 6, extending down from the front of the seat, may hang independent or may be provided with a hook or bracket 16, so that it may be held from the seat 5, as shown. The hook 16 may be pivotally attached at the point 17 and may hook into an eye 18 on the part 6, as shown. The seat portion 5 may be supported in any manner, however, in the design shown the sides of the carriage are provided with cleats 19 upon which the ends of the member 5 may rest and when positioning the seat the entire seat may be moved forward, the part 4 bent upward, the part 5 raised and placed upon the cleats 19 and then the parts 4 and 6 adjusted to comfortable positions. The position of any of the parts may, therefore, be readily adjusted and the location of the seat in the carriage may also be adjusted to any position. It will also be understood that two of these devices may be used in one carriage, so that two seats may be formed therein, thereby providing accommodation for twins or more than one child. It will also be understood that the parts may be hinged or connected together in any manner or by any means.

It will also be understood that, altho this device is shown as comprising a comparatively flat or folded member, this member may be formed with cushions on or in the upper surface or may be made of any other material and the usual straps or harness for holding a baby in a seat, or the like, may be used in combination therewith. Other attachments, such as bottle supporting devices, or toys, may be also used in combination therewith.

It will be understood that other changes may be made in the construction without departing from the spirit of the invention. One of which changes may be in the use of a different number of sections to form the seat, another may be in the use of sections of any other shape or design, and still another may be in the use of other means for holding the sections in the different positions.

The construction will be readily understood from the foregoing description. In use the device may be provided as shown and described and may be built into a baby carriage or supplied independent thereof, or used in any manner. It will be noted that it may be placed upon the floor of a baby carriage, and when it is desired to form a seat it may be raised or adjusted to the position shown, and it will also be understood that it may readily be placed back in the flat position, or adjusted to any position, as may be desired. This device makes it possible to use the baby carriage for sleeping, or as a crib, or to readily form a seat therein, and the child may be comfortable in any position.

Having thus fully described the invention what I claim as new and desire to secure by Letters Patent, is:

The combination with a baby carriage having a body, wheels, and a handle; of two horizontal bars positioned on the inner surfaces of the side walls of the body of the carriage, said bars positioned about midway of the carriage and adapted to support the ends of a seat that may be placed thereon, said bars arranged to be practically obscured when not in use, a collapsible seat having a central or intermediate portion forming the seat, and having two end sections hinged thereto, one of which is adapted to extend downward from the forward edge of the seat and the other upward from the rear of the seat, all of said sections also adapted to be positioned in a straight line on the bottom of the carriage, and bars pivotally attached to one of said sections at one of their ends and with their opposite ends adjustably connected to another of said sections, said bars adapted to hold the section at one end of said seat in an upright position, and the section at the opposite end of said seat in a downwardly extending position.

PHILIP KILIMNIK.